Figure 1:
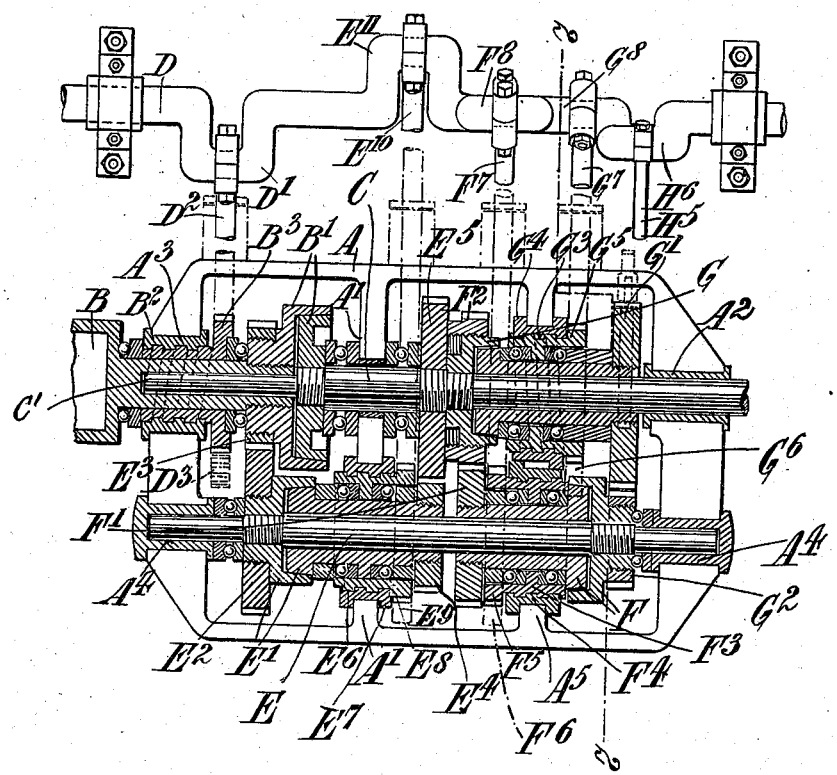

No. 881,273. PATENTED MAR. 10, 1908.
C. WICKSTEED.
GEARING.
APPLICATION FILED AUG. 9, 1906.

2 SHEETS—SHEET 1.

Witnesses:
Thomas Durant
Harry C. Bates

Inventor:
Charles Wicksteed
by Church & Church
his Attys

No. 881,273. PATENTED MAR. 10, 1908.
C. WICKSTEED.
GEARING.
APPLICATION FILED AUG. 9, 1906.
2 SHEETS—SHEET 2.
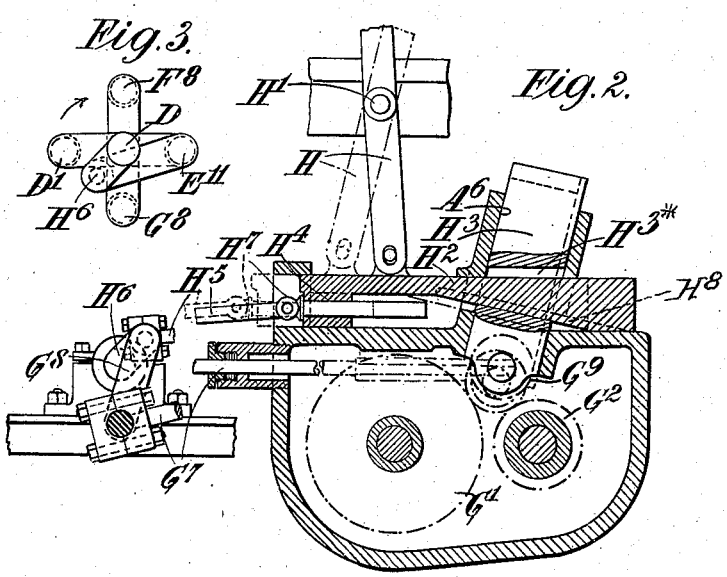
Witnesses:
Thomas Durant
Harry C. Bates
Inventor:
Charles Wicksteed,
by Church & Church
his Atty.

UNITED STATES PATENT OFFICE.

CHARLES WICKSTEED, OF KETTERING, ENGLAND.

GEARING.

No. 881,273.      Specification of Letters Patent.      Patented March 10, 1908.

Application filed August 9, 1906. Serial No. 329,937.

*To all whom it may concern:*

Be it known that I, CHARLES WICKSTEED, a subject of the King of England, and a resident of Kettering, Northamptonshire, England, have invented certain new and useful Improvements in Speed-Gearing, of which the following is a specification.

This invention is for improvements in or relating to speed gearing, particularly adapted for use in motor vehicles, and has for its object to provide a gearing the various clutch members of which are controlled from a crank-shaft common to all the clutches.

According to one method of carrying out this invention, the driven shaft is mounted coaxial with the motor or driving shaft and one member of a friction clutch is carried by the motor shaft and the corresponding member by the driven shaft. One of these members preferably that on the motor shaft is operatively connected with a screw-threaded sleeve which engages a correspondingly screw-threaded bearing or liner carried by the gear-box. On this screw-threaded sleeve is a toothed wheel and this is engaged by a rack operatively connected with one crank of a shaft conveniently situated outside the gear-box and disposed parallel to the driven shaft. Within the gear-box and also parallel to the driven shaft is a lay-shaft, and various gearing are interposed between these two shafts, each controlled by a friction clutch which in turn is controlled by a screw-threaded sleeve operated by a rack on one or other of the cranks on the crank shaft already referred to. One of these gears constitutes a reversing gear, but although its corresponding clutch is thrown into or out of engagement by the crank shaft it is necessary to separately move the reversing wheel into mesh before this portion of the gear becomes operative; this prevents any accidental throwing in of the reversing gear. The mechanism for bringing this wheel into mesh is operatively connected with a stop whereby movement of the crank-shaft into a position for bringing any but the slowest speed into operation is prevented when the reversing wheel is in. The object of thus locking the crank-shaft against movement into certain positions is to prevent the accidental throwing in of any but the slow speed while the reversing wheel is in operative position, for it will be seen that when the crank-shaft is in position for putting the reverse in operation, the whole gear is running idle unless the reverse wheel is brought into mesh whereby an idle position is obtained for use in the ordinary manipulation of the car.

It will be understood that the cranks on the shaft are so disposed relatively to each other that when one gear is "in" all the others are "out" and an intermediate position may be provided where all of the gears are "out"; if only one speed and a reverse is employed, this would of course still hold good, except that the separate operation of the reversing wheel is necessary to complete the throwing "in" or "out" of the reverse. The gear operated from a single crank-shaft in this manner is readily under control as a single hand-wheel suitably connected with the shaft is all that is required for changing the speed.

In the accompanying drawings which illustrate one method of carrying out this invention:—Figure 1 is a plan of the gearing with the upper half of the box removed and the gear wheels shown in section; Fig. 2 is a transverse section of the same on the line 2—2 of Fig. 1, and viewed from the left, and Fig. 3 is an end elevation of the crank-shaft *per se*.

Like letters indicate like parts throughout the drawings.

The gearing is inclosed in a casing A of any convenient construction and divided longitudinally along the plane of the shafts mounted therein, whereby access may be readily had to the gearing. The motor shaft B enters the gear casing on the left as shown in Fig. 1, and carries the female member of a friction clutch $B^1$. The shaft B does not extend far into the casing and is hollow at its end to receive one end $C^1$ of a driven shaft C. The driven shaft finds a bearing in a web $A^1$ near the free end of the motor shaft and at the other end is supported in a bearing $A^2$ in the wall of the casing through which it extends for the purpose of connecting to, say, the differential gear of the road wheels. Fast on the left-hand end of this shaft is the corresponding male member of the friction clutch $B^1$. The motor shaft B or that portion of it which lies in the casing is movable endwise within given limits for the purpose of bringing the clutch parts $B^1$ into engagement, and this movement is effected by a screw-threaded sleeve $B^2$ which is fast on the shaft and engages a correspondingly threaded bearing sleeve $A^3$ fast on the wall of the casing.

Fast on the sleeve $B^2$ is a toothed wheel $B^3$ which engages a rack, indicated by chain line at $D^3$. The rack is connected by a rod $D^2$ to a crank $D^1$ on a crank-shaft D, situated outside the casing and disposed parallel to the shaft C. As shown the clutch $B^1$ is in engagement but if the crank-shaft D be turned in either direction, the sleeve $B^2$ whose thread is right-handed, will be rotated in such direction as to move the shaft B to the left whereby the clutch members will be separated and thus the shafts B and C disconnected.

Parallel to the shaft C and carried in bearings $A^4$ in the casing A is a lay-shaft E. Fast on the left-hand end of this shaft is the female member of a friction clutch $E^1$ and on this member is secured a toothed wheel $E^2$ which meshes with a smaller wheel $E^3$ secured on the female member of the clutch $B^1$. The male member of the clutch $E^1$ is free to slide on the shaft E and carries a toothed wheel $E^4$ which meshes with a larger toothed wheel $E^5$ fast on the driven shaft C.

The wheels $E^2$, $E^3$, $E^4$, $E^5$ constitute the slow speed and are brought into operation by the clutch $E^1$. This clutch is controlled in a similar manner to the clutch $B^1$ and carries a screw-threaded sleeve $E^6$ which engages a correspondingly screw-threaded bearing $E^7$ fast in the web $A^1$ of the casing. The sleeve $E^6$ carries a toothed wheel $E^8$ and this is engaged by a rack, indicated in chain line at $E^9$, and connected by a rod $E^{10}$ to a crank $E^{11}$ on the crank-shaft D. The crank $D^{11}$ is set at an angle of 180° relatively to the crank $D^1$ and in the position shown in the drawings the clutch $E^1$ is out of engagement. The thread of the sleeve $E^6$ is left-handed whereas that of the sleeve $B^2$ is right-handed as already mentioned. The object of this arrangement is to enable both clutches to be thrown in by movement of both of the operating racks in the same direction although the direction of axial movement of one clutch member for engagement is opposite to that of the corresponding member of the other clutch. The sliding members of the various clutches throughout the gearing are similarly arranged with right or left-hand threaded sleeves according to the direction of axial movement for clutching so that all of the racks are advanced in one direction to effect clutching and all withdrawn in the other direction to throw their respective clutches out; this avoids confusion when adjusting the respective racks, for setting up the clutches, as the operator does not require to consider in which direction any particular rack is moved for the purpose of clutching. It will be seen that the lay-shaft is always rotating, as the wheel $E^2$ is in constant engagement with the wheel $E^3$ and this latter is rigidly connected with the motor shaft.

The middle speed is brought into operation by a friction clutch F, the female member of which is fast upon the shaft E and is consequently always rotating. The male member is free on the shaft E and has secured to it a toothed wheel $F^1$ which engages a larger wheel $F^2$ carried for convenience on the female member of a clutch G hereinafter described; this member is fast on the driven shaft C.

The clutch F is controlled by a sleeve $F^3$ having a right-hand thread. The sleeve is carried in a correspondingly-threaded bearing $F^4$ fast in a web $A^5$ in the casing A. The sleeve $F^3$ has on it a toothed wheel $F^5$ which engages a rack indicated in a chain line at $F^6$. The rack is connected by a rod $F^7$ to a crank $F^8$ on the shaft D, this crank being set at an angle of 90° relatively to the cranks $D^1$ and $E^{11}$. In the position shown in the drawings the clutch F is disengaged.

The female member of the clutch G already referred to as carried fast on the driven shaft C, engages a male member free upon the shaft which has fast upon it a toothed wheel $G^1$. The wheel $G^1$ lies in the same plane as a similar toothed wheel $G^2$ fast on the female member of the clutch F which, as already stated, is rigidly secured to the shaft E. The wheel $G^2$ is thus constantly rotating, but it does not engage the wheel $G^1$ except through a separately operated reversing wheel hereinafter described. The clutch G is controlled by a left-hand screw-threaded sleeve $G^3$ carried in a correspondingly screw-threaded bearing $G^4$ fast in the web $A^5$ of the gear-box. On the sleeve $G^3$ is a toothed wheel $G^5$ which engages a rack, indicated in chain line at $G^6$. The rack $G^6$ is connected by a rod $G^7$ to a crank $G^8$ fast on the shaft D and set at an angle of 180° to the crank $F^8$.

The operation of this gearing is as follows: With the crank-shaft D in the position shown in the drawings, the clutch $B^1$ is in engagement so that the fast speed is obtained by the direct coupling of the driven shaft C to the motor shaft B; meanwhile the shaft E is running idle as the clutches $E^1$ and F are out of engagement and as the wheel $G^2$ does not engage the wheel $G'$, the wheel $G^2$ and its clutch member are at rest. If now the shaft D be turned in either direction, it will bring the clutch $B^1$ out of engagement and if turned in the direction of the arrow, Fig. 3, the middle speed will be brought into operation by engagement of the members of the clutch F. Further movement of the shaft D in the same direction will throw the clutch F out of engagement and throw the clutch $E^1$ into engagement whereby the slow speed is thrown in. Similarly, further movement of the shaft, still in the same direction, throws the slow speed out of engagement and brings the members of the clutch G into engagement with each other for the purpose of reversing. Before, however, the clutch G is brought into operation, the reversing wheel $G^9$, Fig. 2, should be brought into mesh with the wheels G¹ G². This is done by means of a separate operating lever H pivoted to the frame of the vehicle, as indicated at H¹ and engaging at its free end a sliding cam H². The cam slides in suitable guides on the cover of the gear-box A and engages a sliding block H³ in the lower end of which the wheel G⁹ is pivoted. The block slides in approximately vertical guides A⁶ on the cover of the gear-box and is slotted at H³ to receive the cam H². The cam H² is dovetailed on the underside at H⁸ and the inner faces of the slot H³ are similarly shaped so that as the cam is moved to the right it lifts and holds the block up, and the reversing wheel G⁹ out of mesh, whereas when it is moved to the left the block H³ and reversing wheel G⁹ are carried down sufficiently far to put the wheel in mesh with the wheels G¹ G² above which it is situated. At the free end of the cam member H² is a lug or stop H⁴, and free to slide in this is one end of a jointed rod H⁵ whose other end is connected to a crank H⁶ on the shaft D. The rod has a shoulder H⁷ adapted to butt against the stop H⁴ when the cam H² is in the operative position, that is, when it has been advanced to the left of Fig. 2 for the purpose of throwing the wheel G⁹ into engagement.

The object of the stop H⁴ is to prevent the movement of the crank-shaft D direct from the reversing position into a fast-speed position. This is effected by the coöperation of the stop and the shoulder H⁷ as follows:—When the reversing wheel G⁹ is in mesh, the stop H⁷ is advanced in a direction approximately radial to the shaft D so that should any attempt be made to continue the rotation of the shaft in the direction indicated by the arrow, without first withdrawing the reversing wheel G⁹ from the operative position, the rod H⁵ will be advanced by the movement of the crank-shaft and its shoulder H⁷ be brought against the stop so that further movement in that direction will be arrested. It will thus be seen that no speed except the slow-speed can be thrown in when the reversing wheel is in operation, although access can be readily had to the fast speeds when the wheel G⁹ is out of mesh.

Although this gearing has been described as applied to a motor vehicle it will be understood that it may be employed for any purpose requiring a variation of speed or a reverse movement without departing from the sprit of this invention.

Obviously the shaft D referred to throughout as a crank shaft might take the form of a shaft carrying a series of eccentrics, but any such mechanical equivalent is intended to be included by this term throughout the specification and claims.

What I claim as my invention and desire to secure by Letters Patent is:—

1. In speed gearing the combination of, two clutches each having a part movable axially into and out of engagement with its coöperating part, a rotatable operating shaft (D) having two eccentric bodies thereon, means for operatively connecting one eccentric body with the axially movable part of one clutch in such manner that rotary movement of the shaft imparts axial movement to the clutch part, means for operatively connecting the second eccentric body with the axially movable part of the second clutch in such manner that rotary movement of the shaft produces axial movement of this second clutch part, substantially as set forth.

2. In speed gearing the combination of, two clutches each having a part movable axially into and out of engagement with its coöperating part, a rotatable operating shaft (D) having two eccentric bodies thereon, means for operatively connecting one eccentric body with the axially movable part of one clutch in such manner that rotary movement of the shaft imparts axial movement to the clutch part, means for operatively connecting the second eccentric body with the axially movable part of the second clutch in such manner that rotary movement of the shaft produces axial movement of this second clutch part, the angular position of one of the eccentric bodies on the shaft relatively to the other being such that when the shaft is turned to cause one body to throw its connected clutch part into engagement the other is moved to bring its connected part out of engagement, substantially as set forth.

.3. In speed gearing the combintaion of, two clutches each having a part movable axially into and out of engagement with its coöperating part, a screw-threaded sleeve carried on one of the axially movable clutch parts, means for holding the sleeve against endwise movement on the clutch part but permitting it to rotate freely thereon, a stationary screw-threaded part engaging the thread on the sleeve, a pinion carried by the sleeve, a rack engaging the pinion, a screw-threaded sleeve on the second axially movable clutch part, means for holding this sleeve against endwise movement on the clutch part but permitting it to rotate freely thereon, a stationary screw-threaded part engaging the thread on this sleeve, a pinion carried by this sleeve, a rack engaging the pinion, a rotatable operating shaft (D) having two eccentric bodies thereon, means for operatively connecting one of the eccentric bodies to the first of the aforesaid racks, and means for operatively connecting the second eccentric body to the second of the aforesaid racks, substantially as set forth.

4. In speed gearing the combination of, a driving shaft, a driven shaft, a clutch part carried fast on one of these shafts, a corresponding clutch part carried by the other shaft and movable axially into engagement with the first part, gearing intermediate the driving and driven shafts, including a clutch having a member movable axially to operatively connect the driving and driven shafts through said intermediate gearing or disconnect the same, a rotatable operating shaft (D) having two eccentric bodies thereon, means for operatively connecting one eccentric body with the axially movable part of the first of the aforesaid clutches in such manner that rotary movement of the shaft imparts axial movement to the clutch part, means for operatively connecting the second eccentric body with the axially movable part of the second of the aforesaid clutches in such manner that rotary movement of the shaft produces axial movement of this second clutch part, the angular position of one of the eccentric bodies on the shaft relatively to the other being such that when the shaft is turned to cause one body to throw its connected clutch part into engagement the other is moved to bring its connected clutch part out of engagement, substantially as set forth.

5. In speed gearing the combination of, a main driving shaft, a main driven shaft axially alined therewith, a clutch part carried fast on one of these shafts, a corresponding clutch part in operative engagement with the other shaft and movable axially into engagement with the first part, a counter-shaft parallel to the driving and driven shafts, a toothed wheel fast on the driving shaft, a toothed wheel fast on the driven shaft, a toothed wheel fast on the counter-shaft and meshing with one of the previously mentioned wheels of the main shafts, a second toothed wheel free on the counter-shaft and meshing with that wheel of the main shafts not engaged by the first-mentioned wheel on the counter shaft, a clutch part fast on this wheel, a corresponding clutch part carried by the counter-shaft and operatively engaged therewith, one of these clutch parts being movable axially, a rotatable operating shaft (D) having two eccentric bodies thereon, means for operatively connecting one eccentric body with the axially movable part of one of the aforesaid clutches in such manner that rotary movement of the shaft imparts axial movement to the clutch part, means for operatively connecting the second eccentric body with the axially movable part of the second clutch in such manner that rotary movement of the shaft produces axial movement of this second clutch part, the angular position of one of the eccentric bodies on the shaft relatively to the other being such that when the shaft is turned to cause one body to throw its connected clutch part into action the other is moved to bring its connected clutch part out of action substantially as set forth.

6. In speed gearing the combination of, a driving shaft, a driven shaft, means for operatively connecting the driving and driven shafts such means comprising a clutch having one part movable axially into and out of engagement with the other whereby the driving shaft may be operatively connected to or disconnected from the driven shaft, reversing gearing for connecting the driving and driven shafts such gearing comprising a wheel movable bodily into or out of the train whereby the train may be completed or disconnected, this gearing also comprising a clutch having one part movable axially relatively to the other part so that it may be brought into or out of engagement therewith, a rotatable operating shaft (D) having two eccentric bodies thereon, means for operatively connecting one eccentric body with the axially movable part of the first of the aforesaid clutches in such manner that rotary movement of the shaft imparts axial movement to such clutch part, means for operatively connecting the second eccentric body with the axially movable part of the second of the aforesaid clutches in such manner that rotary movement of the shaft imparts axial movement to this second clutch part, the angular position of one of the eccentric bodies on the shaft relatively to the other being such that when the shaft is turned to cause one body to throw its connected clutch part into action the other is moved to bring its connected clutch part out of action, and means for separately operating the aforesaid movable reversing wheel, substantially as set forth.

7. In speed gearing the combination of, a driving shaft, a driven shaft, means for operatively connecting the driving and driven shafts such means comprising a clutch having one part movable axially into and out of engagement with the other whereby the driving shaft may be operatively connected to or disconnected from the driven shaft, reversing gearing for connecting the driving and driven shafts comprising a second clutch and an auxiliary movable member which coöperate to operatively connect the reversing gearing with these two shafts, one part of the clutch being movable axially into and out from engagement with its coöperating part, a rotatable operating shaft (D) having two eccentric bodies thereon, means for operatively connecting one eccentric body with the axially movable part of one clutch in such manner that rotary movement of the shaft imparts axial movement to the clutch part, means for operatively connecting the second eccentric body with the axially movable part of the second clutch in such manner that rotary movement of the shaft produces axial movement of this second clutch part, a movable stop, a third eccentric body on the operating shaft, and means for operatively connecting this stop with the third eccentric body in such manner that rotary movement of the shaft moves the stop into and out from the path of the aforesaid auxiliary movable member, the disposition of the eccentric bodies on the shaft being such that when the reversing gear is in the operative position the stop fouls the auxiliary movable member and limits the movement of the operating shaft (D) substantially as set forth.

8. In speed gearing the combination of, a driving shaft, a driven shaft, means for operatively connecting the driving and driven shafts such means comprising a clutch having one part movable axially into and out of engagement with the other whereby the driving shaft may be operatively connected to or disconnected from the driven shaft, reversing gearing for connecting the driving and driven shafts comprising a second clutch and an auxiliary movable member which coöperate to operatively connect the reversing gearing with these two shafts, one part of the clutch being movable axially into and out from engagement with its coöperating part, a rotatable operating shaft (D) having two eccentric bodies thereon, means for operatively connecting one eccentric body with the axially movable part of one clutch in such manner that rotary movement of the shaft imparts axial movement to the clutch part, means for operatively connecting the second eccentric body with the axially movable part of the second clutch in such manner that rotary movement of the shaft produces axial movement of this second clutch part, a movable stop, a third eccentric body on the operating shaft, and means for operatively connecting this stop with the third eccentric body in such manner that rotary movement of the shaft moves the stop into and out from the path of the aforesaid auxiliary movable member the disposition of the eccentric bodies on the shaft being such that when the reversing gearing is in the operative position the stop fouls the auxiliary movable member and limits the movement of the operating shaft (D) and prevents the operating shaft from being turned in such direction as to bring one of the clutches into operation while permitting it to be moved to bring the other into operation, substantially as set forth.

9. In speed gearing the combination of, a driving shaft, a driven shaft, means for operatively connecting the driving and driven shafts such means comprising a clutch having one clutch part movable axially into and out of engagement with the other whereby the driving shaft may be operatively connected to or disconnected from the driven shaft, reversing gearing for connecting the driving and driven shafts such gearing comprising a wheel movable bodily into or out of the train for completing or disconnecting the same, means for moving this wheel into or out of the train, this gearing also comprising a clutch having one part movable axially relatively to the other part so that it may be brought into or out from engagement therewith, a rotatable operating shaft (D) having two eccentric bodies thereon, means for operatively connecting one eccentric body with the axially movable part of the first of the aforesaid clutches in such manner that rotary movement of the shaft imparts axial movement to such clutch part, means for operatively connecting the second eccentric body with the axially movable part of the second of the aforesaid clutches in such manner that rotary movement of the shaft imparts axial movement to this second clutch part, the angular position of one of the eccentric bodies on the shaft relatively to the other being such that when the shaft is turned to cause one body to throw its connected clutch part into engagement the other is moved to bring its connected clutch part out of engagement, a third eccentric body on the operating shaft, a movable stop whose path intersects that of a member movable with the aforesaid movable gear wheel, means for connecting this movable stop with the third eccentric body on the operating shaft, the angular position of this eccentric body being such that when the shaft is turned to bring one of the aforesaid clutches into operation the stop is advanced into the path of the member movable with the aforesaid gear wheel, but when the other clutch is brought into operation such stop is withdrawn and means for separately operating the movable gear wheel, substantially as set forth.

10. In speed gearing the combination of, two clutches each having a part movable axially into and out of engagement with its coöperating part, forward driving gearing controlled by one of these clutches, reversing driving gearing controlled by the other clutch, a wheel in the train of the reversing gearing which can be moved bodily into or out of mesh with the corresponding wheels so that the train is completed or interrupted, means for moving this wheel independently of the operation of the clutch, a movable stop whose path intersects that of a part movable with the movable gear wheel, a rotatable operating shaft (D) having three eccentric bodies thereon, means for operatively connecting one eccentric body with the axially movable part of one clutch in such manner that rotary movement of the shaft imparts axial movement to the clutch part, means for operatively connecting the second eccentric body with the axially movable part of the second clutch in such manner that rotary movement of the shaft produces axial movement of this second clutch part, means for operatively connecting the third eccentric body with the aforesaid movable stop in such manner that rotary movement of the shaft advances or withdraws the stop according to the direction of movement, the angular position of the first and second eccentric bodies being such that when one is turned to bring its clutch into operation the other throws its clutch out of engagement, while the angular position of the third eccentric body and the reversing eccentric body is such relatively to that of the first that the stop is withdrawn when the reversing clutch is brought into engagement, but is advanced when the first clutch is brought into engagement whereby the shaft is prevented from being brought into this position until the movable gear wheel has been moved out of mesh, substantially as set forth.

11. In speed gearing the combination of, two clutches each having a part movable axially into and out of engagement with its cooperating part, the two movable clutch parts moving into engagement in opposite directions, a right-hand screw-threaded sleeve carried on one of the axially movable clutch parts, means for holding the sleeve against endwise movement on the clutch part but permitting it to rotate freely thereon, a stationary screw-threaded part engaging with the thread on the sleeve, a pinion carried by the sleeve, a left-hand screw-threaded sleeve on the second axially movable clutch part, means for holding this sleeve against endwise movement on the clutch part but permitting it to rotate freely thereon, a stationary screw-threaded part engaging the thread on this sleeve, a pinion carried by the sleeve, a rack engaging the pinion of the first clutch, a rack engaging the pinion of the second clutch, both of these racks being on the same side of their respective pinions so that both racks move in the same direction to throw their respective clutches into engagement, a rotatable operating shaft (D) having two eccentric bodies thereon, means for operatively connecting one of the eccentric bodies to the first of the aforesaid racks, means for operatively connecting the other eccentric body to the second of the aforesaid racks, substantially as set forth.

In testimony whereof I have signed my name to this specification in the presence of two subscribing witnesses.

CHARLES WICKSTEED.

Witnesses:
ALFRED J. BOULT,
HARRY B. BRIDGE.